Patented Oct. 14, 1941

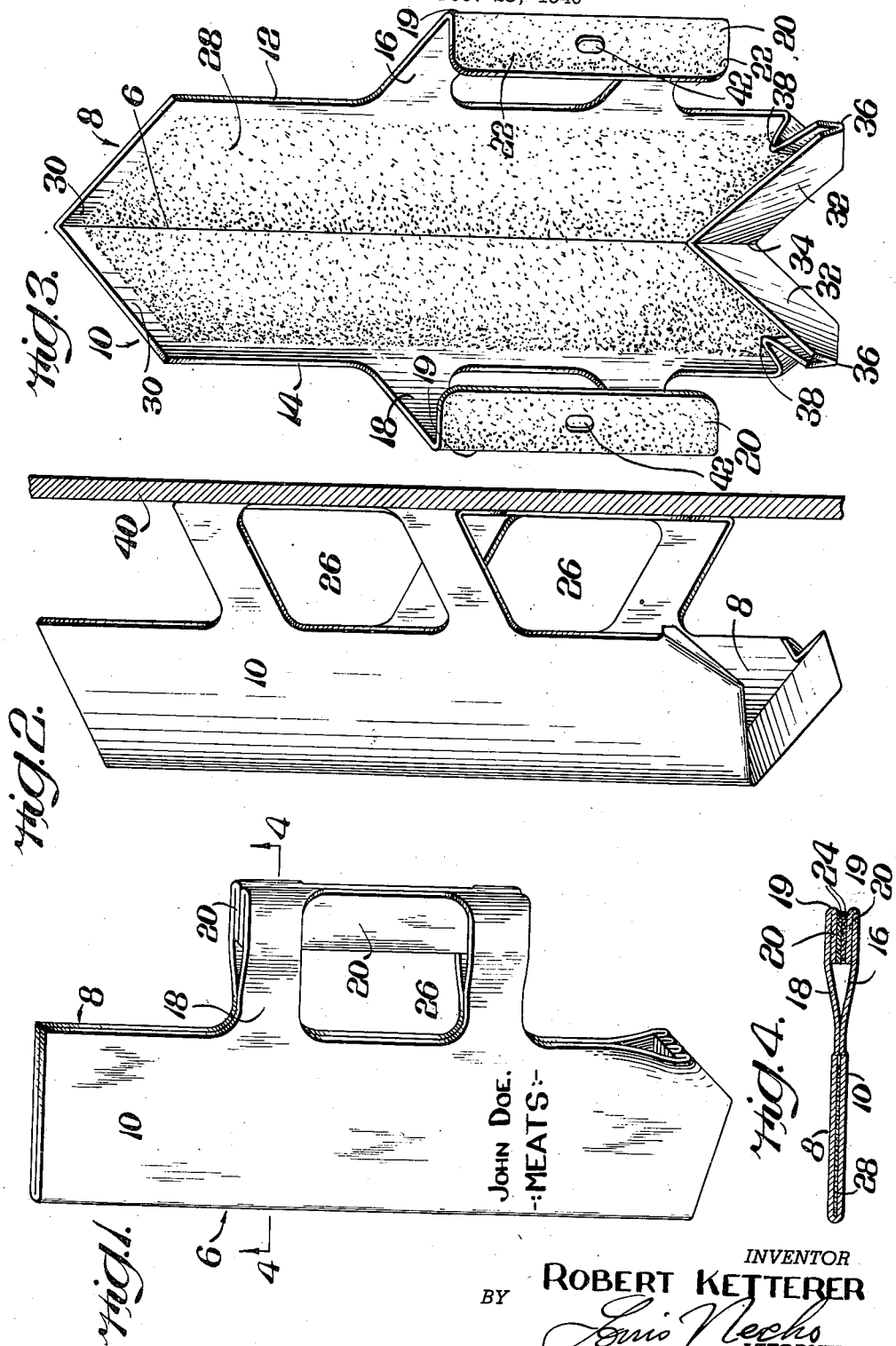

2,258,683

UNITED STATES PATENT OFFICE 2,258,683

INSECT TRAP

Robert Ketterer, Philadelphia, Pa.

Application December 28, 1940, Serial No. 372,109

6 Claims. (Cl. 43—114)

My invention relates to a new and useful insect trap and it relates more particularly to a trap especially adapted for catching insects such as household flies and the like and which, in or out of use, with or without insects caught therein, presents a neat, clean and attractive appearance, and can be handled without soiling the hands.

My invention still further relates to an insect trap of this character which is particularly designed for use as a combination trap and advertising device for use in grocery stores, eating establishments and the like.

My invention further relates to a device of this character which is designed to be self-supporting and easily attached to or detached from any suitable vertical, horizontal, or inclined support such as a wall, a counter, a slanting show case or the like, my device being further adapted to be easily applied to and removed from a straight surface or to a corner formed by the intersection or meeting of two planes or surfaces.

Other features of advantage and construction of my novel device will be more clearly understood from the following specification and the accompanying drawing in which:

Fig. 1 represents a view in side elevation, and slightly in perspective, showing a fly trap embodying my invention in the closed, inoperative position in which it is shipped or handled.

Fig. 2 represents a view, partly in perspective and partly in vertical cross section, showing my device applied to a vertical wall.

Fig. 3 represents a front perspective view of an insect trap embodying my invention shown detached.

Fig. 4 represents a section on line 4—4 of Fig. 1 but showing a slightly modified form of construction.

Referring to the drawing in which like reference characters indicate like parts, my novel insect trap is preferably formed of an integral sheet which is scored as at 6 to form the folding side portions 8 and 10. If desired two separate sheets can be used and their adjacent edges can be hinged together by adhesive paper or other flexible material. From the vertical edges 12 and 14 of the sides 8 and 10 I project the integral fastening members 16 and 18, the ends of which are folded along the line 19 to form the tabs 20. The tabs 20 are provided with any suitable adhesive, diagrammatically shown and designated by the reference numeral 22, of any type which would cause the tabs to adhere with sufficient firmness to any given surface whether it be a wall, or the glass of a show case or the like and which, when removed, will leave very little or no trace. Such adhesives are now available on the market either in paste form or on tape. In Fig. 4 I have shown the use of adhesive tapes 24 in lieu of simply coating the tabs 20 with adhesive as shown in Fig. 3. Otherwise the construction of Fig. 4 is identical with that of Figs. 1 to 3. For lightness, or for convenience of operation in handling, or both, I provide the cut-outs 26 in the body of the extensions 16 and 18. The internal or operative surface of the sides 8 and 10 is coated with a viscous, fly-attracting adhesive 28, which adhesive is of a constantly tacky, plastic or non-drying nature, and which also is calculated to withstand maximum summer temperatures to which it may be subjected in actual use without running or becoming unduly fluid. The inside surface of the extensions 16 and 18 is preferably left uncoated for ease of handling. As for the coating 28 it may extend entirely over the inner surface of the body portions 8 and 10 or a marginal portion 30, extending along the sides and top of the body portions 8 and 10 can be left uncoated if desired. While the adhesive 28 is so constituted as to withstand normal summer temperatures, I nevertheless have provided a guard in the nature of a trough at the lower edge of the sides 8 and 10 which serves to prevent drippage in the event of the coating running under abnormal or extreme temperatures. This trough consists of a strip 32 which is preferably integral with the lower edge of the sides 8 and 10 and which is centrally scored along the line 34 and also along the lines 36 and 38 so that the trough opens out automatically from the closed position shown in Fig. 1 to the position shown in Figs. 2 and 3. As will be seen from Figs. 1 and 4, where the insect trap is shown in the folded or closed position, the entire device lies flat and presents a clean external surface so that it may be shipped and handled in quantity in compact packages. When it is desired to use the insect trap the tabs 20, which are preferably adhesively held together, are separated first and then the body sections 8 and 10 are grasped by the clean, marginal portion 30 and separated into approximately the angular position shown in Figs. 2 and 3. The adhesive surfaces of the tabs 20 are then presented to and pressed against any suitable support 40, such as a wall, the glass of a window in a house or of a show case in a store, or the like, and the insect trap will then look as it appears in Fig. 2. The exterior of the insect trap, while shown in Fig. 1 of the drawing as carrying an advertisement, may be left blank or it may be provided with fanciful decorations which will produce an attractive appearance and which will disguise the nature and purpose of the device. Any flies caught on the adhesive 28 will naturally be invisible and, when it is desired to remove the insect trap, it is grasped by the clean exterior 42, pulled away from the support 40 and the sides 8 and 10 are then pressed together and the adhesive 28 holds them in that position until the trap is carried away to a point of disposal. It will also be seen that my insect trap can be produced at an extremely low price and that it can be handled without soiling the fingers. Also, ordinary fly paper, with or without flies on it, presents a very objectionable appearance. The tabs 20 may be provided with openings 42 which are adapted to engage nails or screws (not shown) driven into the support 40 whereby the insect trap may be secured in position without the necessity of contact or adhesion which may not be desirable in certain cases.

While I have shown the tabs 20 as folded inwardly and having their normally exterior surface coated as at 22 or provided with adhesive tape as at 24, it is to be understood that this process can be reversed so that the normally inner surfaces of the tabs 20 can be provided with the desired adhesive and in that event, when in the position shown in Fig. 1, the tabs 20 will be extending outwardly in straight lines instead of being folded as shown. When so constructed, it is only necessary in order to fasten the device in position to deflect the tabs 20 outwardly and present them to the support 40. Since this expedient from this description will be clear to those skilled in the art, it is not deemed necessary to illustrate the same with drawing.

Having thus described my invention, what I claim as new and desire to secure by Letters Patent is:

1. A device of the character stated comprising a pair of hinged body portions having their inner juxtaposed surfaces covered with an insect-attracting adhesive, a pair of handles projecting from corresponding edges of said portions and means for detachably securing said handles to a support.

2. A device of the character stated comprising a pair of body portions hinged together and having their juxtaposed surfaces covered with an adhesive except for a relatively narrow marginal portion thereof, a pair of handles extending from the corresponding edges of said portions, said handles having inwardly foldable end tabs and an adhesive on said inwardly folded portions of said end tabs for holding the latter together when said body portions are in abutment and for detachably securing the entire device to a support.

3. A device of the character stated comprising a pair of body portions hinged together and having their juxtaposed surfaces covered with an adhesive, a pair of handles extending from the corresponding edges of said portions, said handles having inwardly foldable end tabs, an adhesive on said inwardly folded portions of said end tabs for holding the latter together when said body portions are in abutment and for detachably securing the entire device to a support, and a trough-like member formed along the contiguous edges of one end of said body portions.

4. A device of the character stated comprising a pair of hinged body portions having their juxtaposed surfaces covered with an insect-attracting adhesive, a pair of handles projecting from the corresponding edges of said portions and means for adhesively and detachably securing said handles to a support.

5. A device of the character stated comprising a pair of body portions hinged together and having their juxtaposed surfaces covered with an adhesive, a pair of handles extending from the corresponding edges of said portions, said handles having inwardly foldable end tabs, an adhesive on said inwardly folded portions of said end tabs for holding the latter together when said body portions are in abutment and for detachably securing the entire device to a support, and a trough-like member formed along the contiguous edges of one end of said body portions, said body portions, said handles and said trough-like member being integral.

6. A device of the character stated comprising a pair of hinged body portions having their juxtaposed surfaces covered with an insect-attracting adhesive, a pair of handles projecting from corresponding edges of said body portions, and tabs formed at the ends of said handles and adapted to engage a support, said tabs being deflectable at an angle with respect to said handles.

ROBERT KETTERER.